United States Patent
Lin et al.

(10) Patent No.: US 12,372,733 B2
(45) Date of Patent: Jul. 29, 2025

(54) RETAINER FOR MULTI-FIBER PUSH-ON (MPO) CONNECTOR

(71) Applicant: II-VI Delaware, Inc., Wilmington, DE (US)

(72) Inventors: Joseph Tzyy-Hsien Lin, Cupertino, CA (US); Paul Joseph Perkins, Fremont, CA (US)

(73) Assignee: II-VI DELAWARE, INC., Wilmington, DE (US)

( * ) Notice: Subject to any disclaimer, the term of this patent is extended or adjusted under 35 U.S.C. 154(b) by 198 days.

(21) Appl. No.: 18/069,003

(22) Filed: Dec. 20, 2022

(65) Prior Publication Data

US 2023/0194811 A1    Jun. 22, 2023

Related U.S. Application Data

(60) Provisional application No. 63/292,349, filed on Dec. 21, 2021.

(51) Int. Cl.
*H04B 10/00* (2013.01)
*G02B 6/42* (2006.01)

(52) U.S. Cl.
CPC ......... *G02B 6/4292* (2013.01); *G02B 6/4278* (2013.01)

(58) Field of Classification Search
CPC .. G02B 6/4292; G02B 6/4278; G02B 6/3825; G02B 6/3831; G02B 6/3869; G02B 6/3885; G02B 6/3893; G02B 6/3897; G02B 6/4246; G02B 6/4261; G02B 6/3821; G02B 6/4256; G02B 6/4201; G02B 6/4285
See application file for complete search history.

(56) References Cited

U.S. PATENT DOCUMENTS 5,192,219 A  *  3/1993  Fowler ................. H01R 13/622
                                                              439/321
7,530,605 B2 *  5/2009  Rigollet ................ F16L 37/144
                                                              285/305
(Continued)

FOREIGN PATENT DOCUMENTS

WO       2016053851 A1    4/2016

OTHER PUBLICATIONS

European Search Report issued in European Patent Application No. 22214823.1 Apr. 20, 2023.

*Primary Examiner* — Agustin Bello
(74) *Attorney, Agent, or Firm* — Blank Rome LLP

(57) ABSTRACT

An optoelectronic module includes a housing enclosing at least one optical transmitter or receiver and includes a release mechanism configured to engage with a cage sized and shaped to receive the housing. A cable connector for a fiber optic cable is configured to engage in a port of the module, and a slideable collar on the cable connector can keep the module engaged in the port. For example, the collar can hold tabs or arms inside the port engaged with slots or indents on a body of the connector to prevent the connector from being pulled from the port. A retainer is configured to prevent retraction of a collar on the cable connector so that the connector is not inadvertently removed from the port. By keeping the connector engaged, the retainer may by extension keep the module engaged in the cage by preventing inadvertent release of the release mechanism on the module.

14 Claims, 8 Drawing Sheets

(56) References Cited

U.S. PATENT DOCUMENTS

| | | | |
|---|---|---|---|
| 7,862,366 B2* | 1/2011 | Stone | H01R 13/5219 285/305 |
| 8,855,458 B2* | 10/2014 | Belenkiy | G02B 6/3897 385/137 |
| 9,755,382 B2* | 9/2017 | Gniadek | H01R 13/64 |
| 10,444,442 B2* | 10/2019 | Takano | G02B 6/3893 |
| 11,215,769 B2* | 1/2022 | Seri | G02B 6/3821 |
| 2004/0152354 A1* | 8/2004 | Luther | G02B 6/3882 439/378 |
| 2008/0089650 A1* | 4/2008 | Legler | G02B 6/389 385/59 |
| 2009/0226140 A1* | 9/2009 | Belenkiy | G02B 6/3898 385/134 |
| 2010/0092131 A1* | 4/2010 | Davidson | G02B 6/3813 385/19 |
| 2012/0177335 A1* | 7/2012 | Lee | G02B 6/389 385/136 |
| 2014/0133823 A1* | 5/2014 | Simmons | G02B 6/4441 385/137 |
| 2016/0259135 A1* | 9/2016 | Gniadek | G02B 6/3895 |
| 2016/0349464 A1* | 12/2016 | Chang | G02B 6/3825 |
| 2017/0184798 A1* | 6/2017 | Coenegracht | G02B 6/3817 |
| 2017/0192182 A1* | 7/2017 | Peterson | G02B 6/3885 |
| 2017/0192188 A1* | 7/2017 | Zhang | G02B 6/3885 |
| 2017/0285277 A1* | 10/2017 | Chang | G02B 6/3826 |
| 2018/0329152 A1* | 11/2018 | Verheyden | G02B 6/44528 |
| 2019/0170961 A1* | 6/2019 | Coenegracht | G02B 6/4444 |
| 2019/0353852 A1* | 11/2019 | Lee | G02B 6/3825 |
| 2020/0271866 A1* | 8/2020 | Ninomiya | G02B 6/3893 |
| 2020/0284999 A1* | 9/2020 | Seri | G02B 6/3821 |
| 2020/0341202 A1* | 10/2020 | Saeki | G02B 6/421 |
| 2021/0041641 A1* | 2/2021 | Hu | G02B 6/389 |
| 2021/0109297 A1* | 4/2021 | Chen | G02B 6/3846 |
| 2021/0191050 A1* | 6/2021 | Holmberg | G02B 6/3821 |
| 2021/0278605 A1* | 9/2021 | Chang | G02B 6/3825 |
| 2021/0325619 A1* | 10/2021 | Wang | G02B 6/4292 |
| 2022/0057585 A1* | 2/2022 | Hendrix | G02B 6/3897 |
| 2022/0171138 A1* | 6/2022 | Barthes | G02B 6/3843 |
| 2023/0069745 A1* | 3/2023 | Keith | G02B 6/3831 |
| 2023/0194811 A1* | 6/2023 | Lin | G02B 6/3897 385/88 |
| 2024/0142715 A1* | 5/2024 | Higley | G02B 6/3825 |
| 2024/0151912 A1* | 5/2024 | Higley | G02B 6/3885 |

* cited by examiner

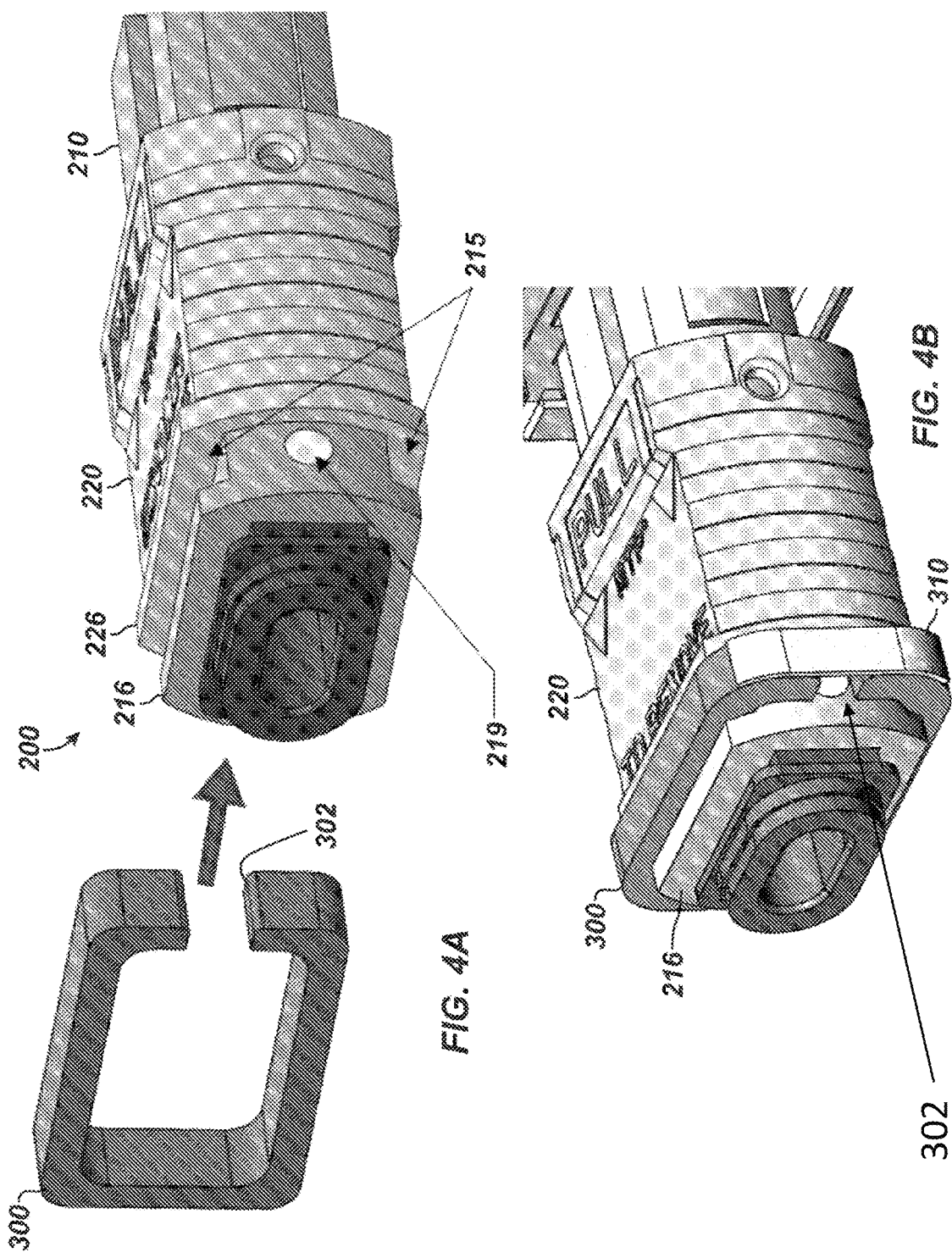

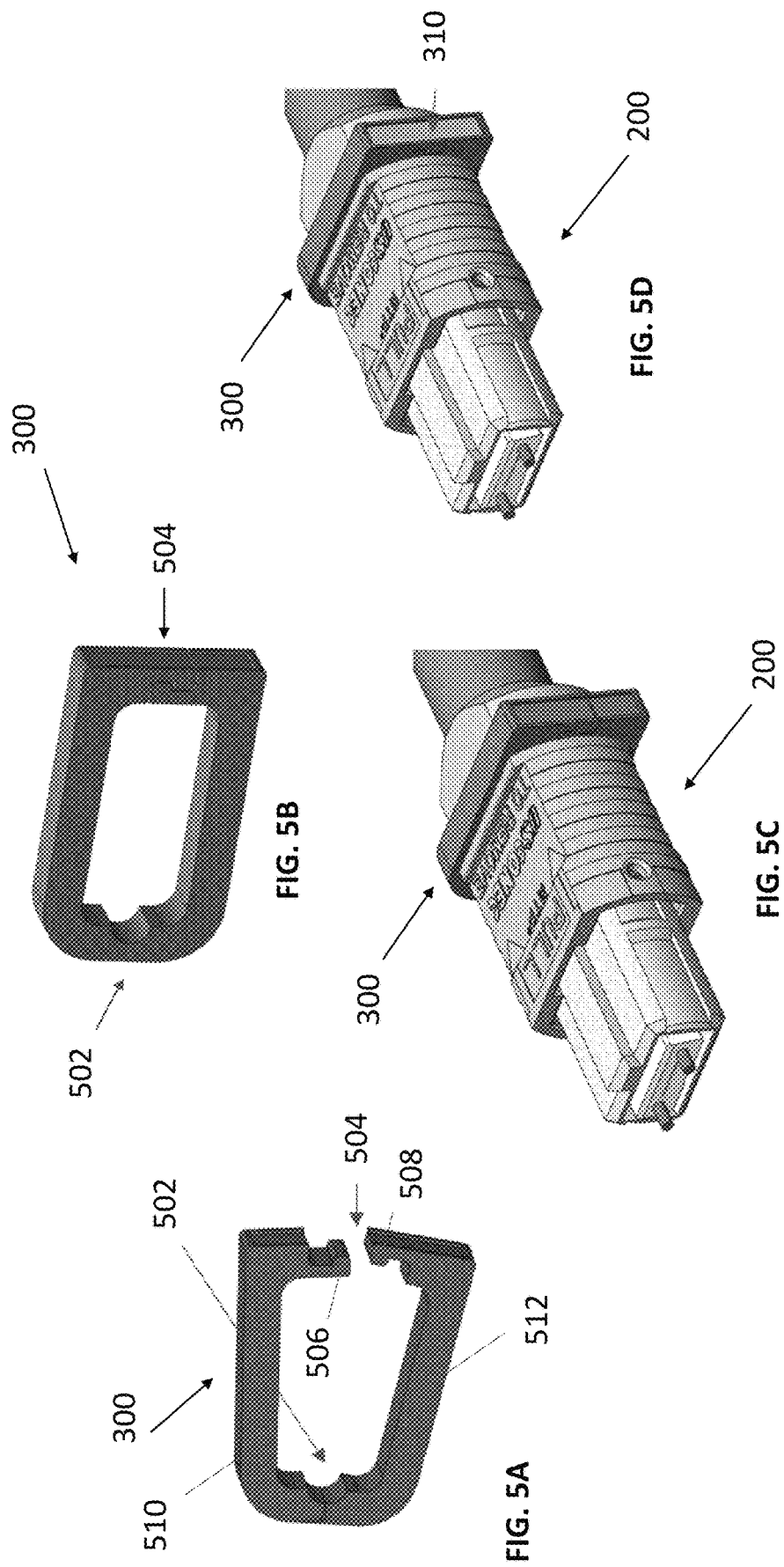

RETAINER FOR MULTI-FIBER PUSH-ON (MPO) CONNECTOR

CROSS REFERENCE TO RELATED APPLICATION

The application claim priority to U.S. Provisional Application 63/292,349, filed on Dec. 21, 2021, the entirety of which is incorporated by reference herein.

FIELD

The present disclosure relates to a retainer for a cable connector and an optoelectronic module.

BACKGROUND

Optoelectronic modules, such as transceivers, are used to transmit data between different devices or different locations. In particular, optical signals may be used to rapidly communication data (via the optical signals) between different devices or different locations. However, most electronic devices operate using electrical signals. Accordingly, optoelectronic modules are used to convert optical signals to electrical signals or to convert electrical signals to optical electrical so optical signals can be used to transmit data between electronic devices. Optoelectronic modules typically communicate with a host device by transmitting electrical signals to the host device and receiving electrical signals from the host device. These electrical signals are then transmitted by the optoelectronic module as optical signals over optical fibers in optical fiber cables.

A network switch is one type of host device that uses optoelectronic modules. The network switch includes multiple cages to receive the optoelectronic modules. In some configurations, the optoelectronic modules can include a coupling mechanism, such as a latch, to retain the optoelectronic modules in their respective cages in the network switch. The coupling mechanism also permits the optoelectronic modules to be removed from the cages. However, in some circumstances, an optoelectronic module may unintentionally or inadvertently disengage from its cage.

Various types of connectors on fiber optic cables are used to connect the cables to ports on the optoelectronic modules. In many cases, the connector has a releasable engagement with the port of the module so the connector can remain installed in the module's ports until intentionally removed. However, in some circumstances, a connector may be disengaged from the port of an optoelectronic module either unintentionally, inadvertently, or in error.

The subject matter claimed herein is not limited to implementations that solve any disadvantages or that operate only in environments such as those described above. Rather, this background is only provided to illustrate one example technology area where some implementations described herein may be practiced.

BRIEF DESCRIPTION OF THE DRAWINGS

FIGS. 4A-4C illustrate perspective views of the MPO connector and the retainer of the present disclosure being installed thereon.

FIGS. 5A-5B illustrates perspective views of a retainer with additional or alternative features in accordance with the disclosure.

FIGS. 5C-D illustrates perspective views of an MPO connector with the retainer of FIGS. 5A-B.

SUMMARY

Figure 1A:
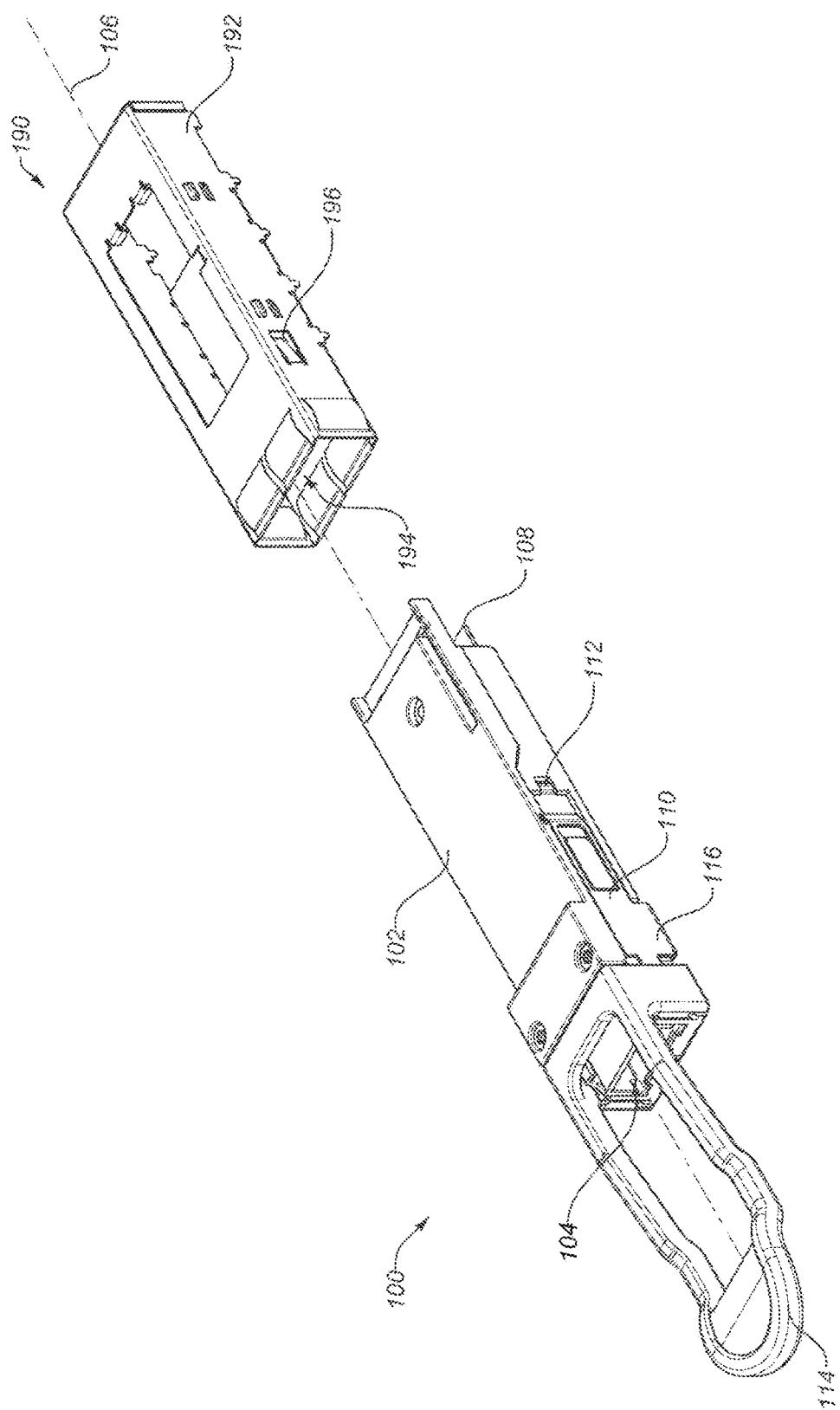
FIG. 1A illustrates a perspective view of an optoelectronic module and a cage.

Disclosed herein are systems including and an optoelectronic module including a port with a protrusion, a connector to plug into the port of the optoelectronic module, including a body including: a shoulder, an indent for engaging with the protrusion of the port, and a collar movably disposed on the body, wherein the collar is configured to surround at least a portion of the protrusions, thereby retaining the protrusion in the indent, and a retainer to retain the connector with respect to the optoelectronic module, wherein the retainer is configured to be inserted in a slot area between the collar and the shoulder of the body, thereby preventing the collar from moving with respect to the body. In another aspect of the invention a system may include a cage, including an opening for receiving the optoelectronic module, where the cage includes a tab, and an optoelectronic module includes a slider with a protrusion, the protrusion of the slider engages with the tab of the cage, thereby retaining the optoelectronic module with respect to the cage 10.

In another aspect of the disclosure, a retainer is shaped like the letter "C". In another aspect of the disclosure a retainer comprises an opening. In another aspect of the disclosure, a retainer comprises chamfers on the outer edge of the opening. In another aspect of the disclosure, an inside of the opening has squared edges. In another aspect of the disclosure, a tamper tape covers the opening of the retainer 300. In another aspect of the disclosure, the tamper tape is transparent. In another aspect of the disclosure, a connector is a Multi-Fiber Push-On (MPO) connector. In another aspect of the disclosure, a collar is biased by a spring. In another aspect of the disclosure, a collar is freely movable on the body. In another aspect of the disclosure, a connector includes a white dot on a side of the body that indicates an orientation of optical fibers in the connector. In another aspect of the disclosure, the retainer includes an interlock to lock the retainer in the slot area. In another aspect of the disclosure, the retainer includes two hooks that form the interlock, where the hooks are configured to snap to each other. In another aspect of the disclosure, the retainer comprises a hinge.

In another aspect of the disclosure, the hinge is a weakened structure adapted to make the retainer 300 more flexible. In another aspect of the disclosure, the retainer include an interlock adapted to lock the retainer in the slot area. In another aspect of the disclosure, a retainer comprises a weakened structure to make the retainer 300 more flexible, the weakened structure is on an opposite side of the interlock.

DETAILED DESCRIPTION

The present disclosure generally relates to retainers for a cable connector of an optoelectronic module. The retainer may prevent the cable connector from inadvertently disengaging from the optoelectronic module or may at least indicate whether the cable connector has been previously disengaged. The retainer may also prevent the optoelectronic module from unintentionally or inadvertently disengaging from a host device, such as a network switch.

A network switch or other type of host device mechanically retains and communicatively couples multiple optoelectronic modules in a network. The network switch include multiple cages sized and shaped to receive the optoelectronic modules. The optoelectronic modules convert electrical signals to optical signals, or vice versa, so the optoelectronic modules can communicate with other network devices via optical signals. The optoelectronic modules are communicatively coupled to the network using cable connectors and fiber optical cables so the optoelectronic modules can communicate optical signals. In turn, the optoelectronic modules are communicatively coupled to the network switch (e.g., to a printed circuit board assembly (PCBA) of the network switch) so the network switch can communicate with the other network devices.

In some configurations, the network switch and the optoelectronic modules may include a coupling mechanism, such as a latch, to retain the optoelectronic modules in their respective cages in the network switch. This coupling mechanism may also permit the optoelectronic modules to be removed from the cages of the network switch. However, in some circumstances, an optoelectronic module may unintentionally or inadvertently disengage from its cage, or a cable connector connected to the optoelectronic module may unintentionally or inadvertently disengage from its module. Optoelectronic modules that inadvertently disengage from their respective cages may result in damage to the optoelectronic modules or the network switch. Likewise, cable connectors that inadvertently disengage from (or are improperly disengaged from) their respective module may result in damage to the optoelectronic modules, the network switch, and the cable connectors. Accordingly, the described embodiments include retainers for cable connectors on optoelectronic modules, which may prevent the cable connectors from disengaging from modules and may further prevent the optoelectronic modules from disengaging from the cages in a network switch.

Figure 1B:
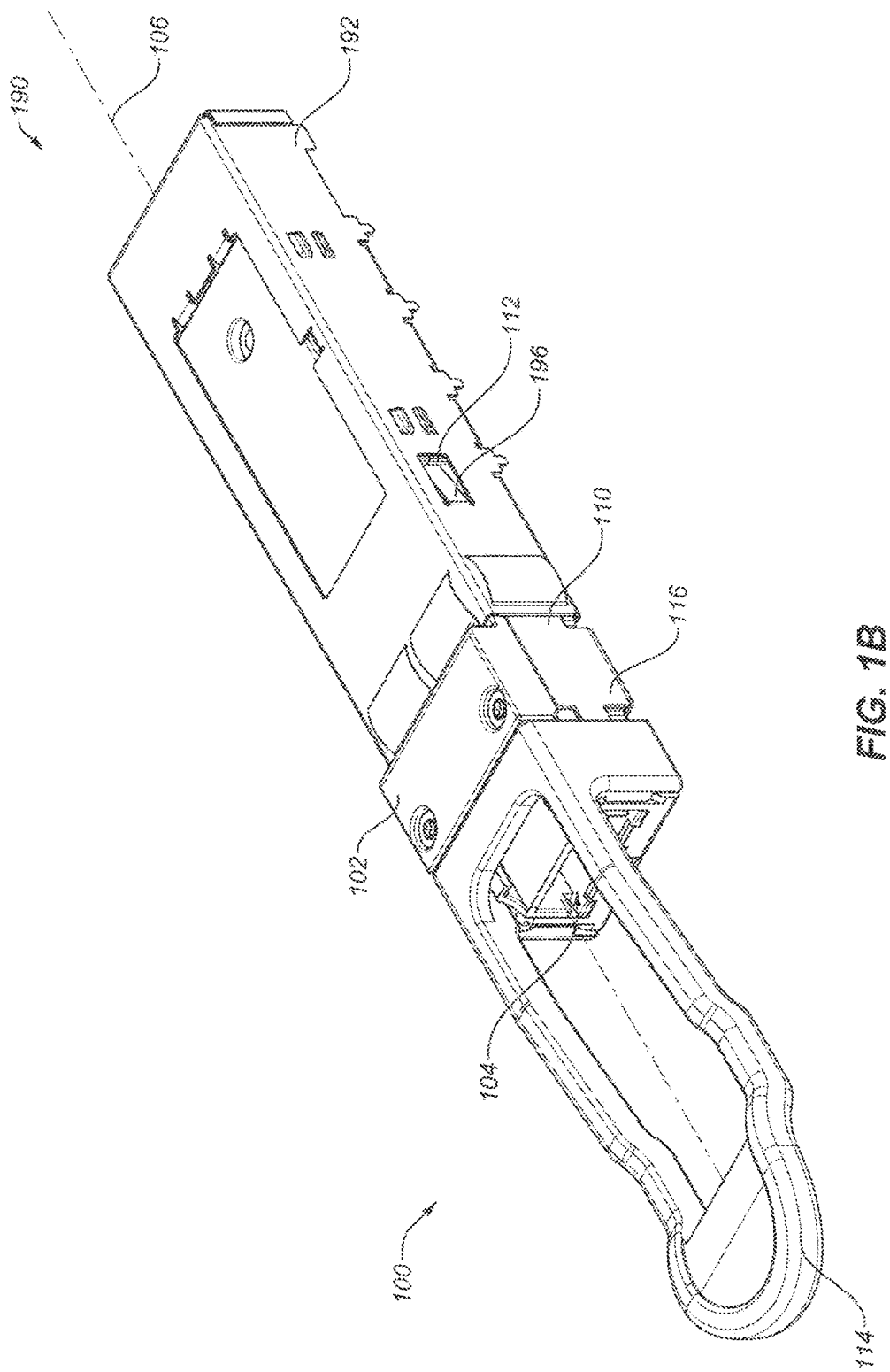
FIG. 1B illustrates a perspective view of the optoelectronic module positioned inside of the cage.

FIGS. 1A-1B illustrate an example of an optoelectronic module 100 and a corresponding cage 190. In particular, FIG. 1A is a perspective view of the optoelectronic module 100 disengaged from the cage 190, while FIG. 1B is a perspective view of the optoelectronic module 100 engaged in the cage 190. As illustrated in FIG. 1A, the optoelectronic module 100 includes a housing 102 that encloses optical, electrical, and optoelectronic components positioned therein. For example, the optoelectronic module 100 has optoelectronic components, such as including optical transmitters (e.g. lasers, etc.) to convert electrical signals to optical signals and such as including optical receivers (e.g., photodiodes, etc.) to convert optical signals to electrical signals. The optoelectronic module 100 may also include corresponding optics, such as lenses, collimators, filters, isolators, and the like, to direct and modulate optical signals travelling to and from the optoelectronic components. The optoelectronic module 100 may include any suitable electrical components, such as drivers to drive the optical transmitters, amplifiers to amplify signals from the optical receivers, controllers to control the operation of the optoelectronic module 100 and the like. The above-mentioned optoelectronic, optical, and electrical components may be at least partially enclosed in the housing 102.

As illustrated, the optoelectronic module 100 includes one or more ports 104 to mechanically and optically couple the optoelectronic module 100 to optical fibers. The port 104 is sized and shaped to receive a cable connector 200 of a fiber optic cable. The cable connector 200 includes a ferrule or other suitable coupler to connect optical fiber(s) to the internal components of the module 100. In the illustrated configuration, the optoelectronic module 100 includes one port 104, although any suitable configuration may be implemented. In the illustrated configuration, the optoelectronic module 100 extends along a longitudinal axis 106 and the cable connector 200 for the optical fiber(s) can be inserted into the port 104 in a direction parallel to the longitudinal axis 106.

When optical fibers are coupled to the optoelectronic module 100, the optoelectronic module 100 can send and receive optical signals with other components in a network. The optoelectronic module 100 includes an electrical coupling 108, such as an edge connector, to electrically couple the optoelectronic module 100 to a host device (not shown). Accordingly, the optoelectronic module 100 allows the host device to communicate with other components in the network by converting electrical signals to optical signals to be transmitted to the other components in the network, and by converting received optical signals to electricals signals to be used by the host device.

The cage 190 includes a body 192 defining an opening 194 sized and shaped to receive the optoelectronic module 100 (or the housing 102 of the optoelectronic module 100). The cage 190 may be included in the host device (not shown) to mechanically and electrically couple the optoelectronic module 100. In particular, the cage 190 can receive and retain the optoelectronic module 100 in the opening 194. Furthermore, the host device includes an electrical coupling, such as a socket, which corresponds to the electrical coupling 108 of the optoelectronic module 100. The socket can receive the edge connector of the optoelectronic module 100 to electrically couple the optoelectronic module 100 to the host device.

Although the illustrated configuration includes one cage 190, the host device includes any suitable number of cages to interface with multiple optoelectronic modules. For example, if the host device is a fiber optic network switch, it includes configurations of 4, 8, 12, 24, 32, 48, 64 ports or any other suitable number of ports and corresponding optoelectronic modules.

The optoelectronic module 100 and the cage 190 includes a coupling mechanism to retain the optoelectronic module 100 with respect to the cage 190. In particular, the cage 109 includes resilient tabs 196, and the optoelectronic module 100 includes a slider 116 with arms 110. When inserted with respect to the cage 190, the arms 110 are configured to engage with the tabs 196 of the cage 190 to prevent removal of the optoelectronic module 100 from the cage 190. In particular, the arms 110 includes protrusions 112 that engage the tabs 196 of the cage 190 thereby preventing movement of the optoelectronic module 100, for example, in a direction parallel to the longitudinal axis 106. The slider 116 and the arms 110 can move with respect to the housing 102 of the optoelectronic module 100, in a direction parallel to the longitudinal axis 106, to engage or disengage the protrusions 112 with respect to the tabs 196. As shown, the arms 110 extend along the housing 102 in a direction parallel to the longitudinal axis 106.

The optoelectronic module 100 can include a handle 114 coupled to the slider 116 to permit a user to easily move the slider 116 in a direction parallel to the longitudinal axis 106 to engage or disengage the optoelectronic module 100 with respect to the cage 190. In the illustrated configuration, the handle 114 extends in a direction parallel to the longitudinal axis 106 and is sized and shaped to be grasped or otherwise manipulated by the user.

As shown in FIG. 1B, the optoelectronic module 100 is inserted in the opening 194 of the cage 190 and is slid into the cage 190 until the housing 102 abuts the cage 190. Once the optoelectronic module 100 is positioned in the cage 190, the protrusions 112 may engage the tabs 196 to prevent the optoelectronic module 100 from being removed from the cage 190, as shown. Because the tabs 196 are resilient, they may be displaced by the protrusions 112 as the optoelectronic module 100 is inserted into the cage 190, until the protrusions 112 move beyond and abut the ends of the tabs 196, in the engaged position shown.

Various types of cable connectors can be inserted in the port 104 of the optoelectronic module 100 to connect a fiber optic cable to the module. One type of connector for use with the optoelectronic module 100 is a Multi-Fiber Push-On (MPO) connector.

Figure 2:
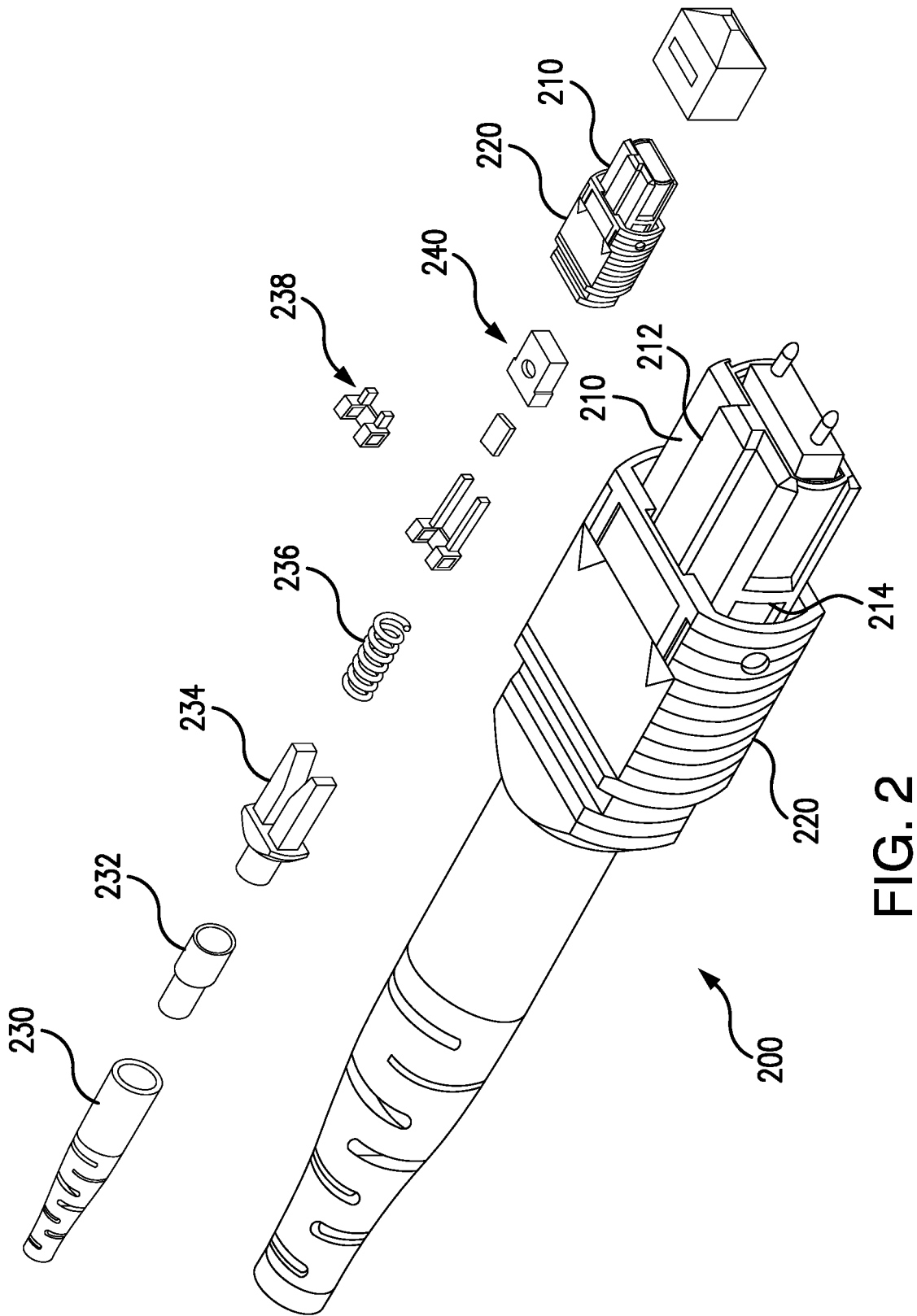
FIG. 2 illustrates a perspective view and an exploded view of a Multi-Fiber Push-On (MPO) connector for use with the optoelectronic module.

As an example, FIG. 2 illustrates a perspective view and an exploded view of an Multi-Fiber Push-On (MPO) connector 200. In general, the MPO connector 200 combines numerous fibers into a clip clamping, multi-core optical fiber connector. The MPO connector 200 includes a number of components. As an example, the MPO connector 200 can include a boot 230 and a crimp ring 232 to hold a cable (not shown) to an inner housing 234 to be held inside an outer housing or connector body 210. A spring 236, clip 238, pins, and molded ferrule 240 all install in the connector body 210. The face of molded ferrule 240 is exposed at the end of the connector body 210, and the face has multiple ferrule ports arranged thereon for the fibers. A collar or sleeve 220 is movably disposed on the outer housing 210. The collar 220 can be biased by a spring or other bias or may simply be freely movable on the connector body 210. Either way, the collar 220 can be moved toward the distal end of the body 210 or can be retracted from the distal end of the body 210.

The connector body 210 includes a key 212 disposed on the top (key-up) or bottom (key-down) of the connector body 210. The alignment key 212 provides for a predetermined alignment of the fiber optic cable within the port (104) by fit within a keying slot of the port (104). Additionally, the connector body 210 includes side slots having indents 214. For a male connector, alignment pins can extend from the face of molded ferrule 240 beyond the connector body 210 between ferrule ports for the fibers. For a female connector, alignment holes can be defined on the face. The ferrule ports for the fiber are arranged in a predefined sequence on the face relative to a white dot on a side of the connector body 210. This indicates orientation of the fibers installed in the MPO connector 200 when installed in the port (104) of the module (100).

Figure 3A:
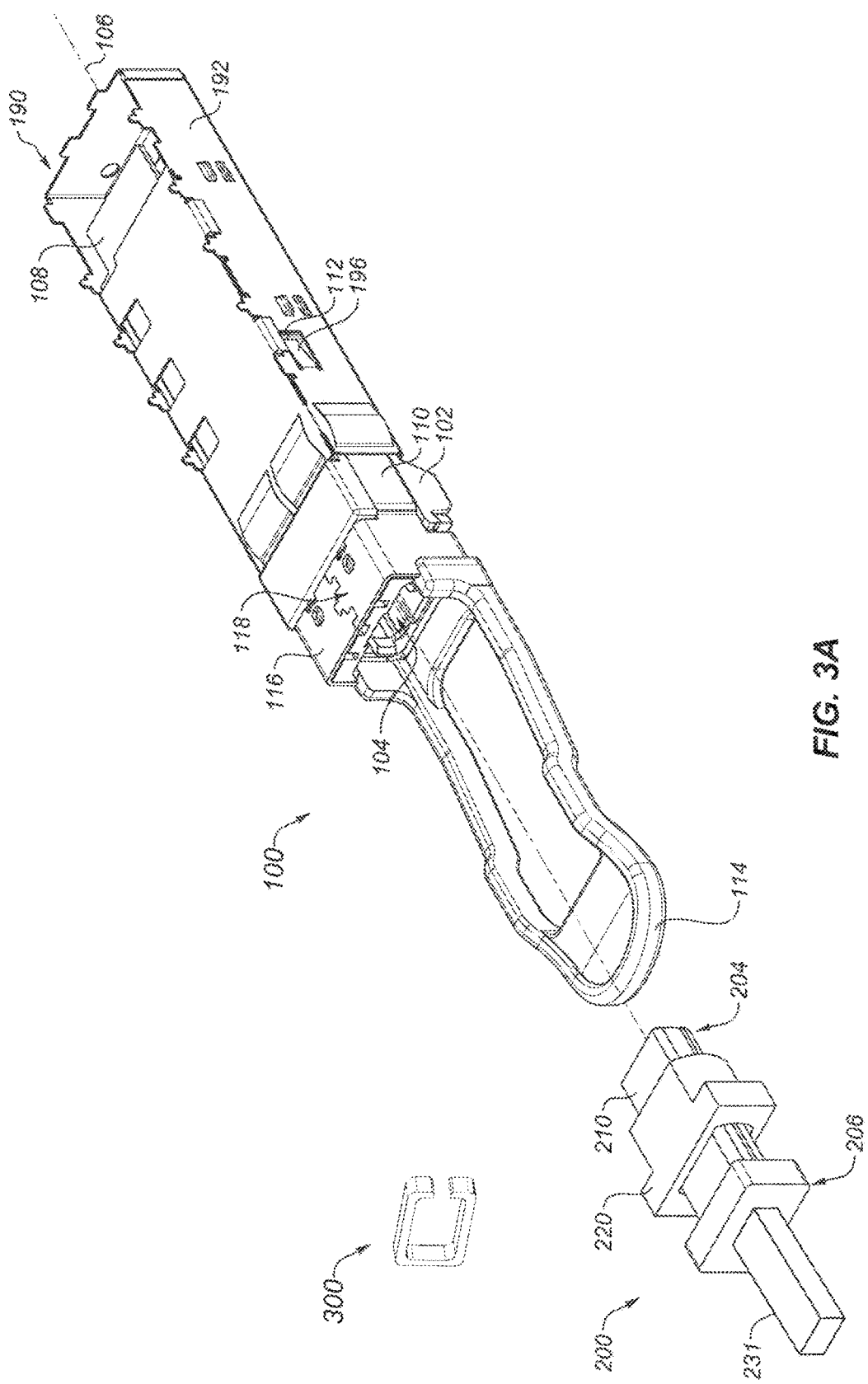
FIG. 3A illustrates a perspective view showing the optoelectronic module positioned inside of the cage, showing the MPO connector ready to install in the module's port, and showing a retainer according to the present disclosure ready to lock the MPO connector in place.

Turning to FIG. 3A, a fiber optic cable 231 has an MPO connector 200 to plug into the port 104 of the module 100 installed in the cage 190. As briefly shown in FIG. 3A, the cable 231 having optical fibers is connected to one end 206 of the connector body 210, and another end 204 of the connector body 210 is configured to insert into the port 104 of the module 100.

When inserted in the port 104, the MPO connector 200 may be configured to deactivate or disable a release mechanism of the optoelectronic module 100, thereby preventing the optoelectronic module 100 from unintentionally releasing from the cage 190. Such a configuration may prevent the optoelectronic modules 100 coming loose of their respective cages 190. Accordingly, the MPO connector 200 may prevent damage to the optoelectronic module 100 or the network switch.

As explained above, for example, the slider 116 on the module 10 can move with respect to the housing 102 of the optoelectronic module 100 in a direction parallel to the longitudinal axis 106 to engage or disengage the protrusions 112 with respect to the tabs 196. Furthermore, the handle 114 is coupled to the slider 116 to permit a user to move the slider 116 in a direction parallel to the longitudinal axis 106 to engage or disengage the optoelectronic module 100 with respect to the cage 190. In the position shown in FIG. 3A, the slider 116 is in an engaged or locked position, with the slider 116 positioned towards the electrical coupling 108 along the longitudinal axis 106. In this position, the handle 114 is also positioned towards the electrical coupling 108, with the handle 114 abutting the housing 102, for example, as shown in FIG. 1B.

In a disengaged or unlocked position, the slider 116 is instead positioned further from the electrical coupling 108 along the longitudinal axis 106. In this position, the protrusions 112 of the slider 116 disengages the tabs 196 of the cage 190 to permit the optoelectronic module 100 to be removed from the cage 190. In particular, the protrusions 112 displace the tabs 196 in a direction away from the optoelectronic module 100, permitting the slider 116 and the protrusions 112 to move past the tabs 196, for example, to permit the optoelectronic module 100 to be removed from the cage 190. A user can move the slider 116 to the disengaged or unlocked position by pulling on the handle 114, which is coupled to the slider 116. Thus, when a user pulls on the handle 114, the slider 116 is moved to the disengaged or unlocked position, thereby permitting the protrusions 112 of the slider 116 to move past the tabs 196.

The slider 116 may not move beyond the disengaged or unlocked position, so when the user continues to pull on the handle 114, the entire optoelectronic module 100 will be pulled along with the handle 114, thereby pulling the optoelectronic module 100 from the cage 190. In practice, when the user pulls on the handle 114 the optoelectronic module 100 can be removed from the cage 190 in a continuous motion, with the slider 116 first being pulled into the disengaged or unlocked position and then the optoelectronic module 100 being pulled from the cage 190.

When the MPO connector 200 is plugged into the port 104, the MPO connector 200 may prevent the slider 116 (and the handle 114) from being moved with respect to the housing 102 or the rest of the optoelectronic module 100 (e.g., in the longitudinal direction) to the disengaged or unlocked position. This in turn prevents the optoelectronic module 100 from being removed from the cage, and from unintentional release from the cage 190.

As briefly shown in FIG. 3A, the MPO connector 200 includes the connector body 210 and the collar 220. The distal end 204 of the connector body 210 is sized and shaped to position inside of the port 104, and the collar 220 is configured to move (e.g. to slide or retract) with respect to connector body 210 to engage/disengage with locking arms or tabs of the port 104.

A retainer 300 as shown in FIG. 3A can attach to the MPO connector 200 so the MPO connector 200 can be permanently attached to the optical module 100. As shown, the retainer 300 can include a "C-shaped" retainer or clip that positions onto the MPO connector's body 210 to prevent the collar 220 from sliding backwards toward the proximal end 206. In this way, the retainer 300 locks the MPO connector 200 engaged in the module's port 104.

Figure 3B:
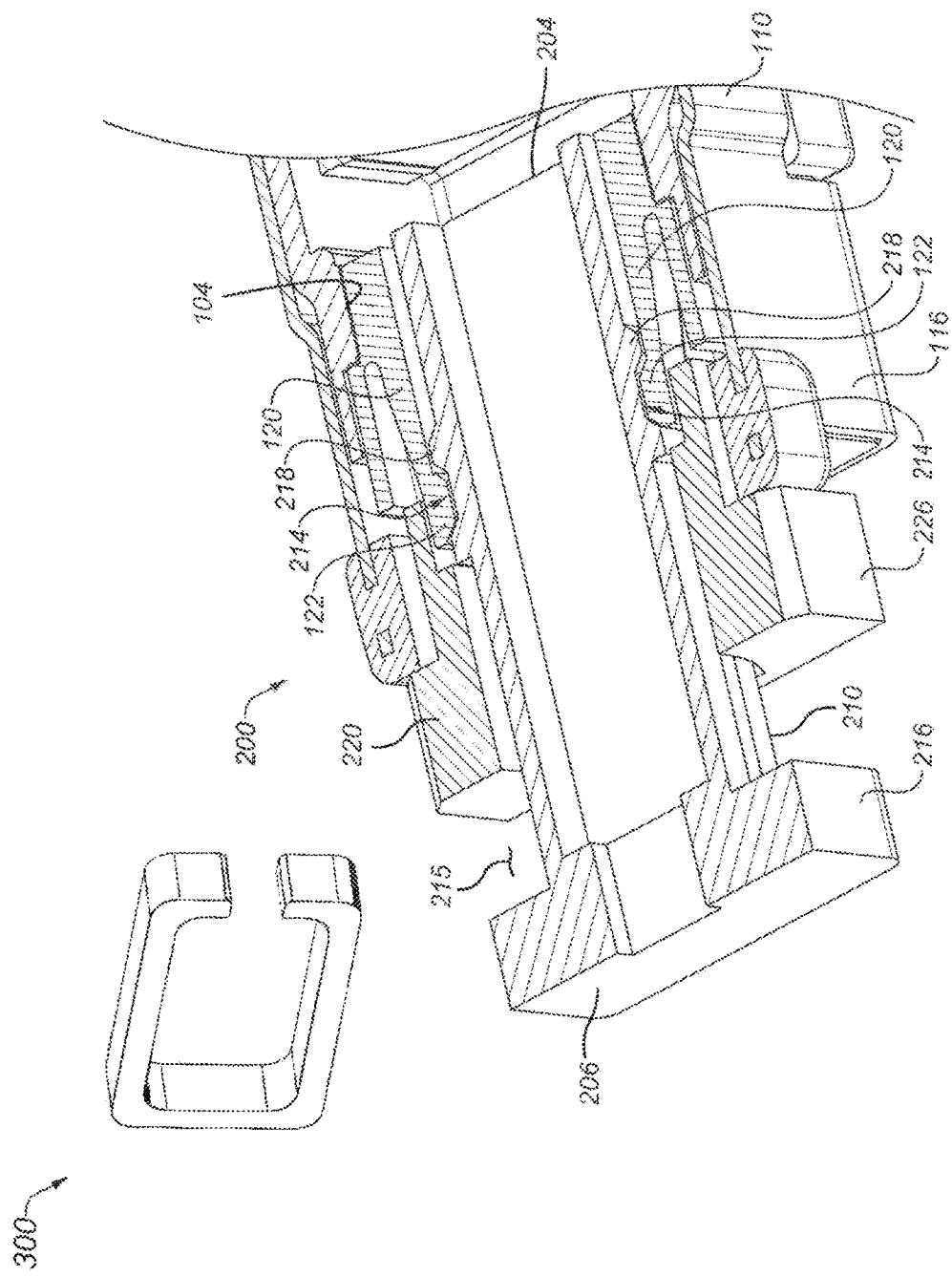
FIG. 3B illustrates a sectional view of a portion of the optoelectronic module and the MPO connector.

For instance, FIG. 3B shows a sectional view of a portion of the MPO connector 200 engaged in the port 104 of the optoelectronic module 100. (Various internal components, such as spring, clip, molded ferrule, etc., of the MPO connector 200 are not shown in FIG. 3B for simplicity). To engage the MPO connector 200 in the port 104, the distal end 204 of the connector body 210 is positioned in the port 104 of the optoelectronic module 100. In this position, the connector body 210 can abut in an interior of the port 104 such that connector body 210 cannot be positioned further in the port 104. The collar 220 is initially positioned away from the port 104.

Once the connector body 210 is positioned fully inside of the port 104 (e.g., to abut the end of the port 104), the collar 220 is then displaced towards the optoelectronic module 100 or displaced at least partially inside of the port 104. The collar 220 is displaced, for example, by a user pushing on the collar 220 in a direction toward the port 104 or the optoelectronic module 100.

Eventually, the collar 220 is positioned further towards the port 104 to engage the connector body 210 with the port 104. As shown, the connector body 210 includes ramps 218 and indents 214 to engage protrusions 122 of tabs or arms 120 in the port 104. When the collar 220 is positioned into the port 104, the collar 220 surrounds at least a portion of the protrusions 122, thereby retaining the protrusions 122 in the indents 214 by preventing the tabs or arms 120 from moving apart. In the illustrated position, the connector body 210 is engaged with the port 104, and the collar 220 prevents the connector body 210 from disengaging from the port 104.

As can be seen, the connection body 210 slides into the port 104 until the tabs 120 inside the port 104 engage into the indents 214 of the connection body 210. The collar 220 may be moved towards the proximal end 206 so the tabs 120 can expand and engage in the slots 214. Then, the collar 220 may be moved towards the distal end 204 over the tabs 120 to retain the tabs 120 in the slots 214. The collar 220 may be biased towards the distal end 204 via springs or alternative types of biasing devices (not shown).

To then retain the collar 220 engaged with the connector body 210, the retainer 300, such as a C-ring or snap ring, is inserted in a slot area 215 between a shoulder 226 of the collar 220 and a shoulder 216 of the connector body 210, thereby preventing the collar 220 from moving with respect to the connector body 210. In this position, the collar 220, the connector body 210, and the port 104 are fixed with respect to one another.

Furthermore, the collar 220 of the MPO connector 200 abuts a portion of the handle 114 to retain both the handle 114 and the slider 116 in a fixed position (e.g., the engaged or locked position) with respect to the housing 102. Thus, the MPO connector 200 is engaged with the port 104 and prevents the handle 114 and the slider 116 from moving with respect to the housing 102 in a direction parallel to the longitudinal axis 106 to the disengaged or unlocked position (e.g., in a direction away from the electrical coupling 108). Thus, the MPO connector 200 is fixed with respect to both the port 104, the housing 102 and the handle 114.

Because the handle 114 is coupled to the slider 116, the MPO connector 200 also retains the slider 116 with respect to the housing 102. This in turn prevents the slider 116 from moving with respect to the housing 102 to deactivate or disable the release mechanism of the slider 116, thereby preventing release of the optoelectronic module 100 from the cage 190.

To remove or disengage the MPO connector 200 from the optoelectronic module 100, the retainer 300 can be removed, which in turn permits the collar 220 to move with respect to the connector body 210, for example, in a direction away from the port 104. Thus, the user may pull the collar 220 away from the port 104.

As the collar 220 moves away from the port 104, it no longer surrounds or abuts the protrusions 122 of the arms 110 inside of the port 104. This in turn permits the arms 110 to spread apart and also permits the protrusions 122 to be removed from the indents 214. Once the arms 110 are able to spread apart unobstructed, the connector body 210 may be removed from the port 104. As the user continues to pull the collar 220 away from the port 104, the collar 220 may eventually about the connector body 210. Then if the user continues to pull on the collar 220, the user will pull the connector body 210 out of the port 104 along with the collar 220 (which abut one another). The user may continue to pull on the collar 220 to fully remove the MPO connector 200 from the port 104.

When the MPO connector 200 is removed, the optoelectronic module 100 is in a disengaged or unlocked position, as described above. Thus, the handle 114 and the slider 116 may be actuated to remove the optoelectronic module 100 from the cage 190. As explained above, the disclosed configurations of the MPO connector 200 may deactivate or disable the release mechanism of the optoelectronic module 100, to prevent the optoelectronic module 100 from unintentionally releasing from the cage 190.

Figure 4C:
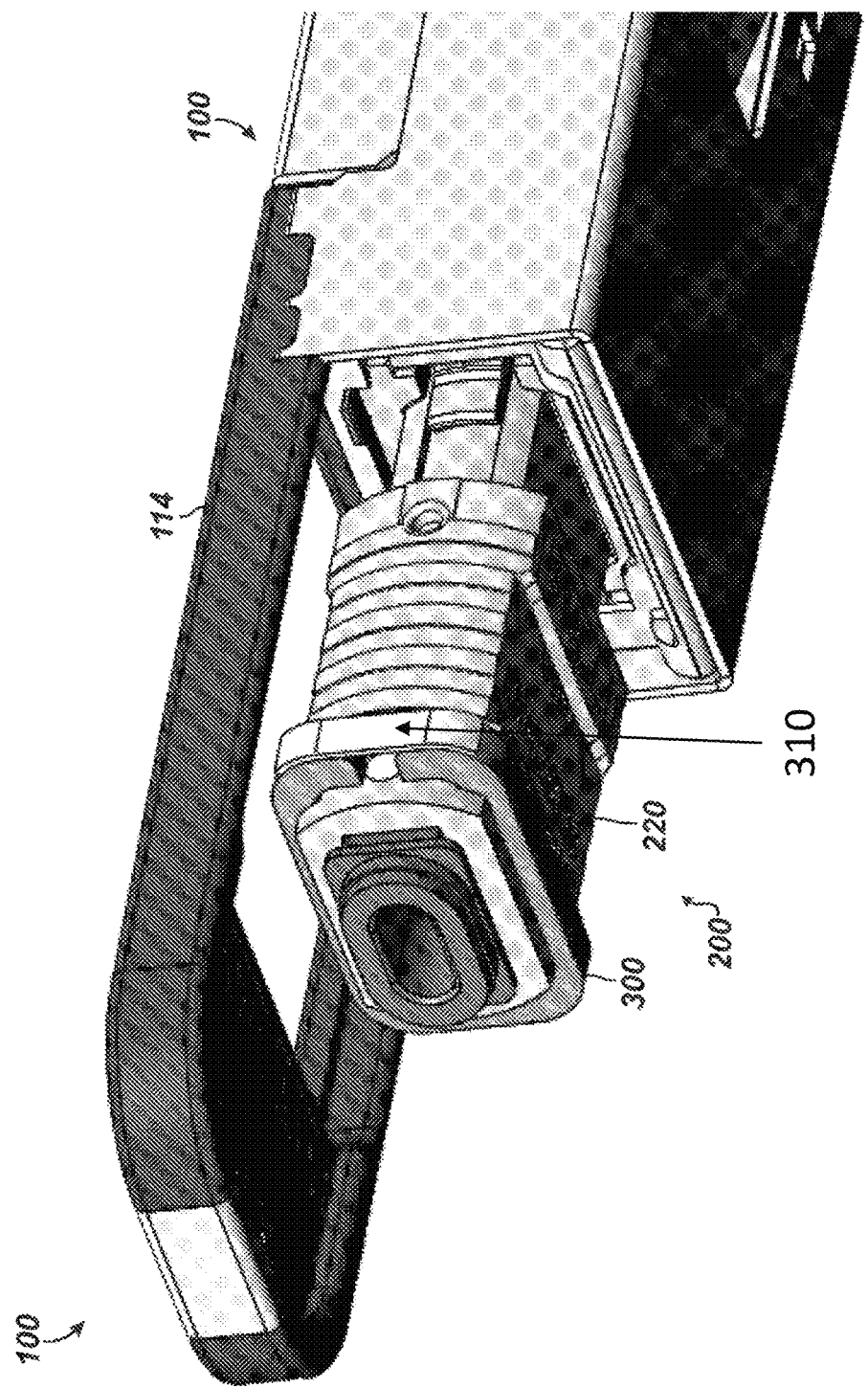

FIGS. 4A-4C illustrate perspective views of the MPO connector 200 and the retainer 300 of the present disclosure being installed thereon. The cable of the MPO connector 200 is not shown for simplicity. As noted, the retainer 300 installs on the connector body 210 in the slot area 215 between the collar's shoulder 226 and the body's shoulder 216. An opening or split 302 in the retainer positions over the white dot 216 on the MPO connector 200 so the white dot 216 remains visible to indicate the orientation of the pin arrangement. Preferably, the opening has chamfers or radii on the outer edge of the retainer 300 for easier installation. The inside of the opening 302, however, has squared edges, which makes the removal of the retainer 300 more difficult.

The retainer 300 prevents the collar 220 from sliding backwards. As a result, the collar 220 cannot release the tabs or arms (120) engaged in the indents (214) of the connector body 210, which holds the connector body 210 in the port (104) of the module (100). Furthermore, a tamper proof tape 310 can cover the opening 302 of the retainer 300 to make sure the retainer 300 has never been removed. The tamper tape 310 can be transparent so the white dot 219 would not be blocked by the tape 310. The presence of this tape 210 can give an indication to users that the MPO connector 200 has not removed from the port 104 and can further indicate that the module 100 has not been removed from the cage 190.

The subject matter of the present disclosure has been described for use with MPO-based transceivers. One example of such a transceiver is a 400G DR4 transceiver, which is an optical transceiver module designed for 400G Ethernet data center interconnect. However, the concept can be used on any MPO connector that is matted into any MPO-style transceiver or any MPO-style cable adapter. In that sense, the retainer disclosed herein can refer in general to an "MPO pigtail retainer."

FIG. 5A illustrates another retainer 300, features of which may be used additionally or alternatively with those described with respect to retainer 300 above. Retainer 300 shown in FIG. 5A includes an interlock 504. The interlock 504 opens and closes the opening 302 of the retainer 300.

FIG. 5A shows the interlock 504 in an open position. The retainer 300 includes an upper part 510 and a lower part 512 of the retainer 302. The interlock 504 includes two hooks 506, 508 or other releasably engaging structural features. A first hook 506 is attached to an end of the upper part 510 and a second hook 508 is attached to an end of the lower part 512. The first and second hooks 506, 508 are configured to snap to each other. The retainer further comprises a hinge 502, which is illustrated as a weakened structure in comparison to upper and lower parts 510, 512, to make the retainer 300 more flexible and to preferentially pivot at the hinge 502 to allow for easier opening and closing of the interlock 504. The hinge may include, for example, a flexible hinge, e.g., an area of thinner material less than the thickness of one or more of upper part 510 and lower part 512. In the example hinge 502 being a flexible hinge, the weakened structure is stressed in the open position of the retainer 300 and unstressed when the retainer 300 is in a closed position which will be described below (see FIG. 5B).

FIG. 5B illustrates the retainer 300 of FIG. 5A in a closed position. The first and second hooks are snapped to each other in the closed position. The weakened structure 502 is unstressed in the closed position.

FIG. 5C illustrates the retainer 300 of FIG. 5B inserted in the slot area 215 between a shoulder 226 of the collar 220 and a shoulder 216 of the body 210. The closed retainer 300 prevents the collar 220 from moving with respect to the body 210, and thus, retains the connector 200 against the optoelectronic module (not shown).

FIG. 5D illustrates the retainer 300 of FIG. 5C with the tamper proof tape 310 that covers the interlock 504 of the retainer 300. Alternatively, or in addition to the tamper proof tape 310 (which may also be tamper evident tape), the interlock 504 itself may be tamperproof or tamper evident or have other tamperproof of tamper evident features that break or disable the retainer 300 if reopened or uninstalled. For example, the retainer 300 may include aligning holes between the upper part 510 and a lower part 512 at interlock 504 for passing a wire lock, zip-tie, or other fastener that must be broken in order for retainer 300 to be opened, or, alternatively or in addition to, the first and second hooks 506, 508 may be sized such that once snapped together, pulling them apart will cause at least one of the first and second hooks 506, 508 to break.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

The invention claimed is:

1. A system, comprising:
an optoelectronic module comprising a port, the port comprising a protrusion;
a connector configured to plug into the port of the optoelectronic module, the connector comprising a body, the body comprising:
a shoulder,
an indent for engaging with the protrusion of the port, and
a collar movably disposed on the body, wherein the collar is configured to surround at least a portion of the protrusion, thereby retaining the protrusion in the indent, and
a retainer configured to retain the connector with respect to the optoelectronic module, wherein the retainer is configured to be inserted in a slot area between the collar and the shoulder of the body, thereby preventing the collar from moving with respect to the body,
wherein, when the retainer is received in the slot area, an entirety of the retainer is outside of the collar and an opening of the retainer is aligned with indicia in the slot area at a side of the body for visual indication of an orientation of the connector.

2. The system of claim 1, further comprising:
a cage defining an opening for receiving the optoelectronic module, wherein:
the cage comprises a tab,
the optoelectronic module comprises a housing and a handle,
the optoelectronic module comprises a slider that is coupled to the handle, the slider comprising a protrusion,
the protrusion of the slider is configured to engage with the tab of the cage thereby retaining the optoelectronic module with respect to the cage, and
the connector, when the retainer is inserted in the slot area between the collar and the shoulder of the body, abuts a portion of the handle and prevents the slider from moving with respect to the housing.

3. The system of claim 1, wherein the retainer is C-shaped.

4. The system of claim 1, wherein the retainer comprises chamfers on an outer edge of the opening.

5. The system of claim 1, wherein an inside of the opening has squared edges.

6. The system of claim 1, further comprising a tamper tape that covers the opening of the retainer.

7. The system of claim 6, wherein the tamper tape is transparent.

8. The system of claim 1, wherein the connector is a Multi-Fiber Push-On connector.

9. The system of claim 1, wherein the collar is biased by a spring.

10. The system of claim 1, wherein the collar is freely movable on the body.

11. The system of claim 1, wherein the indicia comprises a dot on a side of the body that indicates an orientation of optical fibers in the connector.

12. A system, comprising:
an optoelectronic module comprising a port, the port comprising a protrusion, and the optoelectronic module comprising a housing, a handle, and a slider coupled to the handle, the slider being configured to engage a cage;
a connector configured to plug into the port of the optoelectronic module, the connector comprising a body, the body comprising:
a shoulder,
an indent for engaging with the protrusion of the port,
a collar movably disposed on the body, wherein the collar is configured to surround at least a portion of the protrusion, thereby retaining the protrusion in the indent, and
a slot area on an outer surface of the body and defined between the shoulder and an end of the collar, the slot area comprising indicia for visual indication of an orientation of the connector, and a retainer configured to be inserted in the slot area of the body, thereby preventing the collar from moving with respect to the body, wherein, when the retainer is received in the slot area,
an entirety of the retainer is outside of the collar,
an opening of the retainer is aligned with the indicia in the slot area, and
the collar abuts a portion of the handle of the optoelectronic module and prevents the slider from moving with respect to the housing of the optoelectronic module.

13. The system of claim 12, wherein the retainer comprises a C-clip that includes chamfers on an outer edge of the opening and wherein an inside of the opening has squared edges.

14. The system of claim 13, further comprising the cage, the cage defines an opening for receiving the optoelectronic module, and the cage comprises a tab, wherein the slider of the optoelectronic module comprises a protrusion, and the protrusion of the slider is configured to engage with the tab of the cage thereby retaining the optoelectronic module with respect to the cage.

* * * * *